(12) United States Patent
He

(10) Patent No.: US 11,957,157 B2
(45) Date of Patent: Apr. 16, 2024

(54) TOBACCO GRINDER

(71) Applicant: RuiGuang He, Monterey Park, CA (US)

(72) Inventor: RuiGuang He, Alhambra, CA (US)

( * ) Notice: Subject to any disclaimer, the term of this patent is extended or adjusted under 35 U.S.C. 154(b) by 475 days.

(21) Appl. No.: 17/377,360

(22) Filed: Jul. 15, 2021

(65) Prior Publication Data

US 2022/0183342 A1 Jun. 16, 2022

(30) Foreign Application Priority Data

Dec. 14, 2020 (CN) .......................... 202022960020.7

(51) Int. Cl.
*A47J 42/34* (2006.01)
*A24B 7/06* (2006.01)

(52) U.S. Cl.
CPC ...................................... *A24B 7/06* (2013.01)

(58) Field of Classification Search
CPC . A47J 42/34; A47J 42/14; A47J 42/04; A24B 7/06
See application file for complete search history.

(56) References Cited

U.S. PATENT DOCUMENTS

| | | | |
|---|---|---|---|
| 7,422,170 B2 * | 9/2008 | Bao .......................... | B02C 18/08 241/273.3 |
| 7,779,739 B2 * | 8/2010 | Peterson ................... | B26D 3/26 83/858 |
| 8,584,842 B2 * | 11/2013 | Fakhouri .................. | A24F 15/18 206/256 |
| 8,695,906 B2 * | 4/2014 | Hainbach ................ | A47J 42/50 241/273.3 |
| 9,392,908 B2 * | 7/2016 | Edwards .................. | A47J 42/38 |
| 9,622,620 B2 * | 4/2017 | Silberberg .............. | A47J 43/28 |
| 9,730,554 B2 * | 8/2017 | Chan ....................... | B65D 51/24 |
| 9,873,125 B1 * | 1/2018 | LaGuardia, Jr. ......... | A24F 13/00 |
| 10,039,418 B2 * | 8/2018 | Staiano ................... | A47J 42/00 |
| 10,694,894 B1 * | 6/2020 | Ashton .................... | A47J 42/36 |
| 10,779,684 B2 * | 9/2020 | Lavalle ................... | A47J 42/34 |
| 10,820,753 B2 * | 11/2020 | Sanchez ................. | B02C 18/08 |
| 10,912,419 B2 * | 2/2021 | Abehasera .............. | B02C 18/16 |
| 11,161,120 B2 * | 11/2021 | Migale .................... | B02C 13/24 |
| 2014/0138465 A1 * | 5/2014 | Yen ........................... | A24C 5/40 241/69 |
| 2016/0278430 A1 * | 9/2016 | Shalom .................... | A47J 42/34 |
| 2016/0302620 A1 * | 10/2016 | Repac ..................... | B26D 3/185 |
| 2017/0164786 A1 * | 6/2017 | Camitta ................... | A24B 7/06 |
| 2017/0202396 A1 * | 7/2017 | Gumbel .................. | A47J 42/12 |
| 2017/0245541 A1 * | 8/2017 | Pagan ..................... | A47J 42/12 |
| 2018/0103805 A1 * | 4/2018 | Huang ..................... | B02C 19/08 |
| 2018/0126386 A1 * | 5/2018 | Witko ..................... | B02C 18/16 |

(Continued)

*Primary Examiner* — Faye Francis
(74) *Attorney, Agent, or Firm* — Jen-Feng Lee, Esq.

(57) ABSTRACT

Present invention teaches a tobacco grinder with a guide shell and a grinder assembly consisting of an upper grinder part and a lower grinder part that is attached to a support shell. A material drawer is located on the side of the guide shell, slidably placed inside a slid slot, with a lock/release operation performed by a push release lock mechanism, making it easy for a user to operate. A curved well guides the ground tobacco down from the grinding chamber and funneled into the material drawer. The magnetized feature also makes the operation easy even if the grinder unit is help up-side-down.

6 Claims, 5 Drawing Sheets

(56) References Cited

U.S. PATENT DOCUMENTS

| | | | | |
|---|---|---|---|---|
| 2018/0271328 A1* | 9/2018 | Petrossian | ............... | A47J 42/24 |
| 2019/0000140 A1* | 1/2019 | Manning | ................ | A24F 19/10 |
| 2021/0030206 A1* | 2/2021 | Trzecieski | ............. | B02C 18/18 |
| 2022/0346442 A1* | 11/2022 | Smith | .................... | A24F 23/00 |

* cited by examiner

TOBACCO GRINDER

PRIORITY CLAIM

Present application claims the foreign priority of an application filed in China dated Dec. 14, 2020, application number 202022960020.7. A Request to Retrieve Electronic Priority Application (SB/38) is attached along with this application.

FIELD AND BACKGROUND OF THE INVENTION

Present invention disclosed and claimed a tobacco grinder for smokers who enjoy smoking from freshly ground tobacco leaves.

The presently available tobacco grinding products used smaller grinding contact surface, more in the way of a "grater" (structurally close to a cheese grater or ginger grater used in kitchens) that are not efficient. Although some existing products come with a collection mechanism, a drawer, for example, there is no simple-to-use drawer operation and locking mechanism.

Some other grinder products use cutting blades, which pose inherent dangers to users.

The present invention uses a rotating upper/lower set of grinding teeth, housed in respective grinder parts, that are simple and easy, and safe for a consumer to operate to obtain freshly cut/ground tobacco.

Additionally, the present invention magnetized the grinder assembly so that there is an attraction force to keep the upper grinder part and the support shell together due to the magnetic attraction when the upper grinder part is placed to fit slidably onto the support shell. The convenience of use of present invention is greatly enhanced due to such magnetic feature.

SUMMARY OF THE INVENTION

The height tobacco grinder of present invention is comprised of a guide shell, a grinding assembly fitted on top the guide shell. A collection tray is fitted below the guide shell.

A material drawer is slidably fitted to a sliding slot on a side of the guide shell; the material drawer is kept in place, in the sliding slot of the guide shell by a push release lock.

The push release lock uses over-the-shelf push-lock mechanism to actuate the movements of a hook piece into open or close positions via the actions of consecutive pushes by human hands (or fingers), similar in the way a push-button ball point pen's operation, so as to grab a T-shaped piece into lock or release configuration.

A curved well is formed around the inside space of the guide shell, serving to funnel ground tobacco from the grinding chamber formed between the grinder teeth sets of the upper grinder part and the lower grinder part down into the material drawer.

The grinder assembly is further comprised of a lower grinder part, an upper grinder part, and a support shell attached to the lower grinder part, with the upper grinder part rotatably connected to the support shell. A chamber is formed between the upper grinder part and the lower grinder part, each has respective sets of grinding teeth, where the tobacco material will be ground down in size and will fall through the curved well down to the material drawer.

The grinder assembly can be magnetized so as to form an attraction force to keep the upper grinder part and the support shell together due to the magnetic attraction. The magnetic force is of such gentle strength that a human can easily pick up the upper grinder part away from the support shell, but sufficient to keep the upper grinder part attached to the support shell even if holding the tobacco grinder up-side-down.

DESCRIPTION OF THE DRAWINGS

The accompanying drawings, which are incorporated in and constitute a part of this specification, illustrate and exemplify the preferred embodiments of the invention. Together with the description, serve to explain the principles of the invention.

A brief description of the drawings is as follows.

DETAILED DESCRIPTION OF THE PREFERRED EMBODIMENT

The height tobacco grinder of present invention is comprised of a guide shell 1, a grinder assembly 2 fitted on top the guide shell 1. A collection tray 3 is fitted below the guide shell 1.

Figure 1:
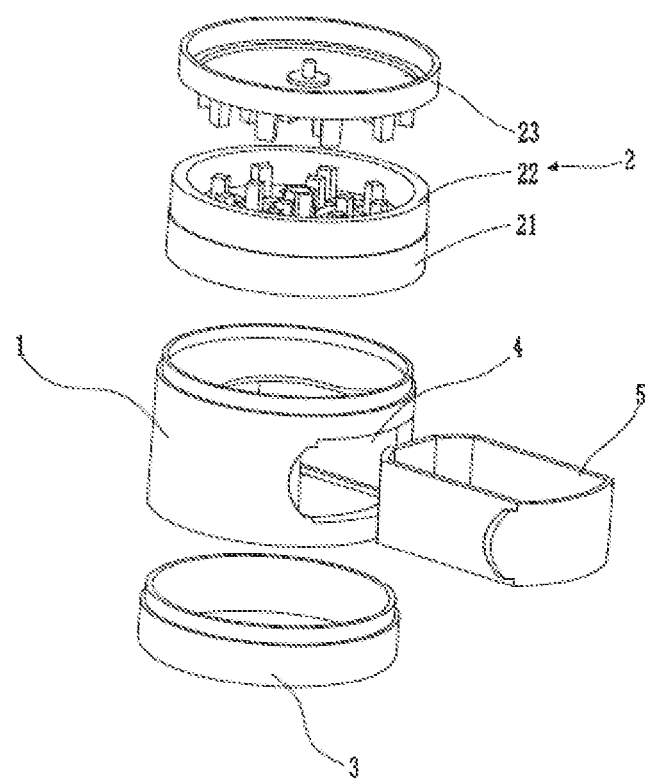
FIG. 1 is the exploded view of the present invention with main parts shown.
Figure 2:
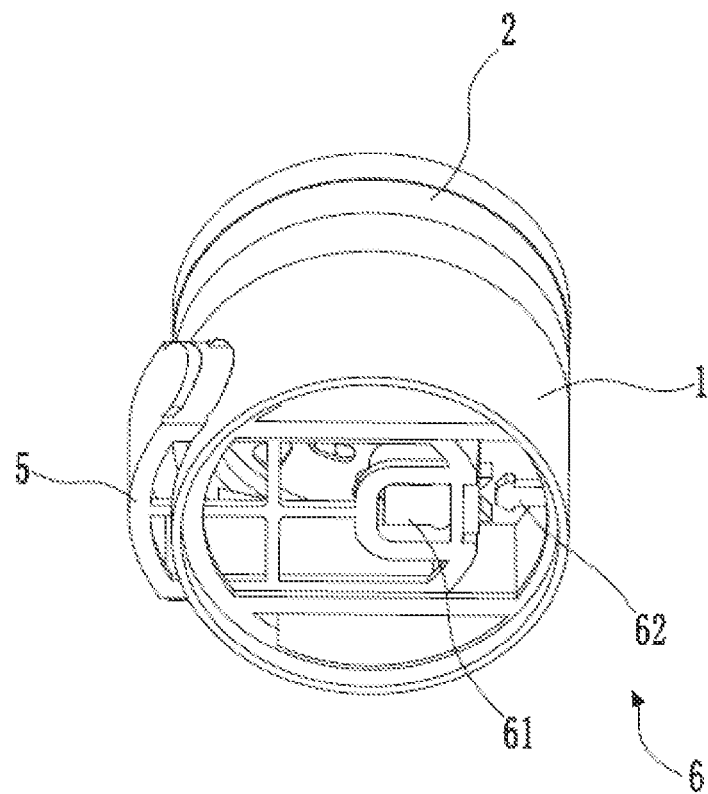
FIG. 2 is the bottom view of the present invention with the material tray removed to show the inside.

The guide shell 1 further has a material drawer 5 slidably fitted to a sliding slot 4 on a side of the guide shell 1; the material drawer 5 can be secured to the guide shell 1 by a push release lock 6. FIGS. 1 and 2 show these features.

The push release lock 6 consists of a push release hook 61 located on a distal end of the material drawer 5 and a T-tongue 62 located on an inside surface of the guide shell 1. The push release hook 61 uses over-the-shelf push-lock mechanism to actuate the movements of the push release lock 6 into open or close positions via the actions of consecutive pushes by human hands (or fingers), similar in the way a push-button ball point pen's operation, so as to grab the T-tong 62 into lock or release configuration when locking the material drawer 5 in, or allowing the material drawer 5 to be sliding out of the sliding slot 4.

With this push release lock 6 mechanism, a person can hold the grinder unit in his/her hand and engage in the grinding action by rotating the upper grinder part 23 relative to the support shell 22 and lower grinder part 21, without concern that the material drawer 5 may fall out if the grinder unit is not held upright.

Such push lock mechanism of the push release hook 61 needs no further explanation as this is simply known art being incorporated into the specific part of this tobacco grinder invention.

Figure 3:
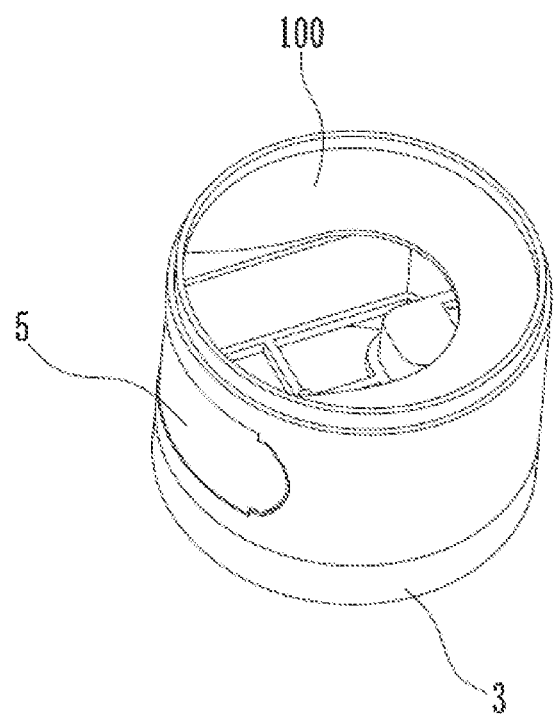
FIG. 3 shows the guide shell with the material drawer inside.

A curved well 100 is formed around the inside space of the guide shell 1, as shown in FIG. 3, serving to funnel ground tobacco down into the material drawer 5.

The grinder assembly 2 is further comprised of a lower grinder part 21, an upper grinder part 23, and a support shell 22 attached to the lower grinder part 21, with the upper grinder part 23 rotatably connected to the support shell 22.

The exploded view of FIG. 1 shows that the upper grinder part 23 and the lower grinder part 21, when connected together, form a chamber to grind tobacco.

The upper grinder part 23 is further comprised of an upper grinder plate 231 and a plurality of upper grinding teeth 232;

the lower grinder part 21 is further comprised of a lower grinder plate 211, a plurality of lower grinder teeth 212, and a plurality of drop holes 213.

When the upper grinder part 23 is rotated around the support shell 22, the plurality of upper grinder teeth 232 will move in an interlacing pattern relative to the plurality of lower grinder teeth 212, producing the grinding function intended on the tobacco material placed inside the chamber.

Figure 4:
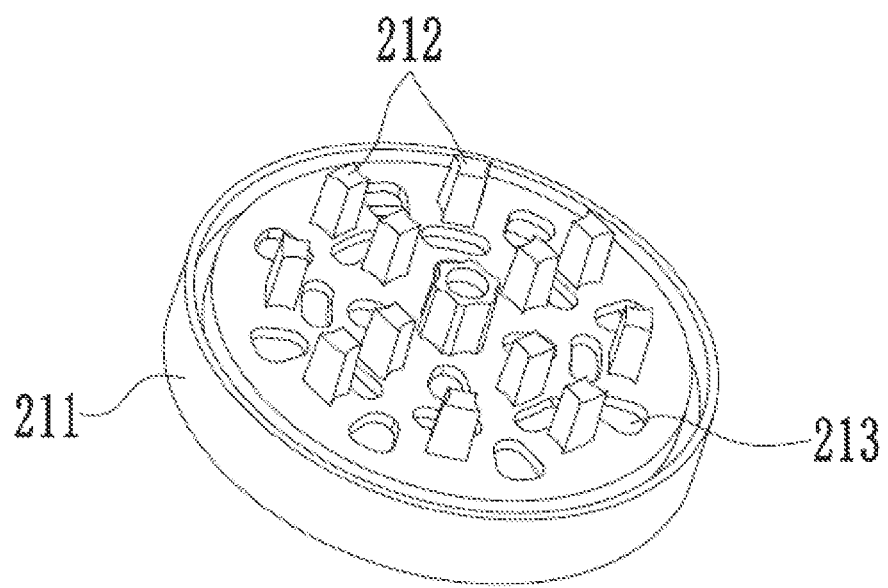
FIG. 4 shows the lower grinder part.
Figure 5:
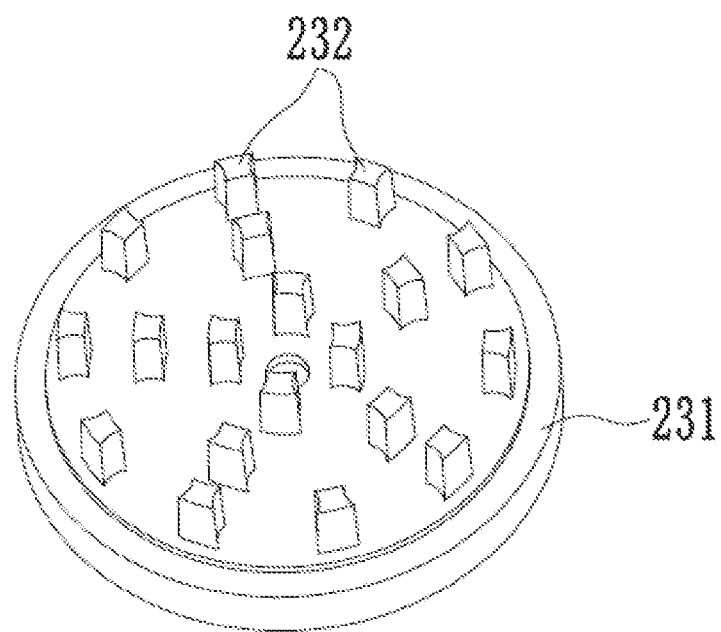
FIG. 5 shows the upper grinder part.

The preferred shape of the upper grinder teeth 232 and the lower grinder teeth 212 can be pillars with the cross-section of a rhombus or a square, as shown in FIGS. 1, 4, and 5. However, the grinding performance should work well as long as there are angles along the side of each of the pillar, instead of a continuous curve surface like that of a cylinder, such as the shape of a kitchen rolling pin. The angled edges of the upper grinder teeth 232 and the lower grinder teeth 212 help with the cutting/grinding function without posing any safety risks to users.

The grinder assembly 2 can optionally uses metal materials that can be magnetized so as to form an attraction force to keep the upper grinder part 23 and the support shell 22 together due to the magnetic attraction when the upper grinder part 23 is placed to fit slidably onto the support shell 22. The magnetic force is of such gentle strength that a human can easily pick up the upper grinder part 23 away from the support shell 22, but sufficient to keep the upper grinder part 23 attached to the support shell 22 even if holding only the support shell 22 of the tobacco grinder in a reversed orientation.

FIGS. 4 and 5 show the patterns of the lower grinder teeth 232 and the upper grinder teeth 212 in a way that the rotational movements of the upper grinder part 21 relative to the support shell 22 cause the tobacco material to be ground down by the plurality of the teeth 212 and 232. The ground tobacco material will then fall through the drop holes 213 down to the material drawer 5, funnel down by the curved well 100.

Optionally, the bottom of the material drawer 5 can be made into a mesh, or a net, allowing very small particles to fall down, instead of staying inside the material drawer 5. These very small particles will then be removed from the collection tray 3.

It should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. Tobacco grinder, comprising:
   a guide shell;
   a grinder assembly fitted on top the guide shell;
   a collection tray fitted below the guide shell, wherein the guide shell further having a material drawer slidably fitted to a sliding slot on a side of the guide shell, and the material drawer can be secured to the guide shell by a push release lock.

2. The tobacco grinder of claim 1, wherein the push release lock consists of a push release hook located on a distal end of the material drawer and a T-tongue located on an inside surface of the guide shell.

3. The tobacco grinder of claim 2, wherein a curved well is formed around inside the guide shell, serving to funnel ground tobacco down into the material drawer.

4. The tobacco grinder of claim 3, wherein the grinder assembly is further comprised of a lower grinder part, an upper grinder part, and a support shell attached to the lower grinder part, with the upper grinder part rotatably connected to the support shell, creating a grinding chamber.

5. The tobacco grinder of claim 4, wherein the grinder assembly uses metal materials that can be magnetized so as to form an attraction force to keep the upper grinder part and the support shell together due to the magnetic attraction when the upper grinder part is placed to fit slidably onto the support shell.

6. The tobacco grinder of claim 4, wherein the upper grinder part is further comprised of an upper grinder plate and a plurality of upper grinding teeth, and wherein the lower grinder part is further comprised of a lower grinder plate, a plurality of lower grinder teeth, and a plurality of drop holes.

* * * * *